United States Patent
Gryb et al.

(10) Patent No.: US 10,250,590 B2
(45) Date of Patent: Apr. 2, 2019

(54) MULTI-FACTOR DEVICE REGISTRATION FOR ESTABLISHING SECURE COMMUNICATION

(71) Applicant: Samsung Electronics Co., Ltd., Suwon-si, Gyeonggi-do (KR)

(72) Inventors: Oleg Gryb, San Francisco, CA (US); Jerome Laurent Dubreuil, San Francisco, CA (US); Luc Julia, Palo Alto, CA (US)

(73) Assignee: Samsung Electronics Co., Ltd. (KR)

( * ) Notice: Subject to any disclaimer, the term of this patent is extended or adjusted under 35 U.S.C. 154(b) by 70 days.

(21) Appl. No.: 14/984,248

(22) Filed: Dec. 30, 2015

(65) Prior Publication Data

US 2017/0063834 A1    Mar. 2, 2017

Related U.S. Application Data

(60) Provisional application No. 62/212,497, filed on Aug. 31, 2015, provisional application No. 62/253,625, filed on Nov. 10, 2015.

(51) Int. Cl.
*H04L 29/06* (2006.01)
*H04W 60/00* (2009.01)
*H04L 29/08* (2006.01)

(52) U.S. Cl.
CPC ........ *H04L 63/083* (2013.01); *H04L 63/0876* (2013.01); *H04L 67/12* (2013.01); *H04L 67/28* (2013.01); *H04W 60/00* (2013.01); *H04L 69/14* (2013.01)

(58) Field of Classification Search
CPC ... H04L 63/083; H04L 67/28; H04L 63/0876; H04W 60/00

USPC .................................................... 726/2–10
See application file for complete search history.

(56) References Cited

U.S. PATENT DOCUMENTS

| | | | |
|---|---|---|---|
| 7,133,662 B2 | 11/2006 | Bravo et al. |
| 7,171,460 B2 | 1/2007 | Kalavade et al. |
| 7,296,160 B2 | 11/2007 | Hiltgen |
| 7,721,329 B2 | 5/2010 | Toomey |

(Continued)

FOREIGN PATENT DOCUMENTS

| | | | |
|---|---|---|---|
| EP | 1107089 A1 | 6/2001 |
| EP | 1442350 A2 | 8/2004 |

(Continued)

OTHER PUBLICATIONS

Suarez-Tangil et al., "Evolution, Detection and Analysis of Malware for Smart Devices," IEEE Communications Surveys & Tutorials Year: 2014 , vol. 16 , Issue: 2 pp. 961-987.*

(Continued)

*Primary Examiner* — Roderick Tolentino
(74) *Attorney, Agent, or Firm* — Innovation Counsel LLP

(57) ABSTRACT

A method of secure device registration is presented. The method comprises: receiving a registration request from a device; validating the device on the basis of the registration request; in response to successfully validating the device, sending a passcode to the device via a first connection; prompting a user for the passcode via a second connection different from the first connection; receiving the passcode via the second connection; and sending an authorization token to the device via the first connection.

6 Claims, 5 Drawing Sheets

(56) References Cited

U.S. PATENT DOCUMENTS

| | | | |
|---|---|---|---|
| 8,108,903 B2 | 1/2012 | Norefors | |
| 8,171,303 B2 | 5/2012 | Bronstein | |
| 8,447,977 B2 | 5/2013 | Slick | |
| 8,554,930 B2 | 10/2013 | Blakley, III | |
| 8,751,794 B2 | 6/2014 | Haulund | |
| 9,038,154 B2 | 5/2015 | Lord | |
| 9,166,969 B2 | 10/2015 | Hershberg et al. | |
| 9,706,160 B2 * | 7/2017 | Marsh | H04N 7/17318 |
| 2006/0002556 A1 * | 1/2006 | Paul | G06F 21/43 380/270 |
| 2007/0005963 A1 * | 1/2007 | Eldar | G06F 21/6209 713/168 |
| 2007/0186107 A1 | 8/2007 | Sonetaka | |
| 2008/0005339 A1 | 1/2008 | Kwan | |
| 2008/0098025 A1 * | 4/2008 | Vadlamani | G06F 17/30572 |
| 2008/0282331 A1 | 11/2008 | Teo | |
| 2014/0082715 A1 | 3/2014 | Grajek et al. | |
| 2014/0181911 A1 * | 6/2014 | Kula | H04L 63/0853 726/4 |
| 2014/0372544 A1 | 12/2014 | Wen | |
| 2015/0195594 A1 * | 7/2015 | Hicks | H04N 21/2665 725/25 |
| 2015/0244706 A1 * | 8/2015 | Grajek | H04L 63/0815 726/6 |
| 2017/0075405 A1 * | 3/2017 | Jensen | G06F 1/325 |
| 2017/0078300 A1 * | 3/2017 | He | H04L 63/102 |
| 2017/0093844 A1 * | 3/2017 | Chambliss | H04L 63/0823 |

FOREIGN PATENT DOCUMENTS

| | | |
|---|---|---|
| EP | 2384040 A1 | 11/2011 |
| EP | 2602735 A1 | 6/2013 |
| EP | 2929671 | 10/2015 |
| KR | 100824743 B1 | 4/2008 |
| WO | 2015020360 A1 | 2/2015 |

OTHER PUBLICATIONS

Yoon et al., "Mobile security technology for smart devices," 2015 International Conference on Information and Communication Technology Convergence (ICTC) Year: 2015 pp. 1171-1173.*

* cited by examiner

MULTI-FACTOR DEVICE REGISTRATION FOR ESTABLISHING SECURE COMMUNICATION

CROSS-REFERENCE TO RELATED APPLICATIONS

This application claims priority to and the benefit of U.S. Provisional Patent Application No. 62/212,497, titled "SECURE COMMUNICATION BETWEEN REGISTERED DEVICES USING CERTIFICATES" and filed on Aug. 31, 2015, and U.S. Provisional Patent Application No. 62/253,625, titled "SECURE COMMUNICATION BETWEEN REGISTERED DEVICES USING CERTIFICATES" and filed on Nov. 10, 2015. The entire content of these provisional applications is incorporated herein by reference.

RELATED FIELD

The present disclosure relates to a system and method of secure device registration for establishing a secure communication channel.

BACKGROUND

Technology has advanced to a point at which it has become feasible in many cases to provide network connectivity for ordinary, everyday devices so that these devices may be connected with each other, such as through a local network, or to the Internet. This technological trend is often referred to as the "Internet of Things," and such devices are often referred to as IoT devices. Examples of existing IoT devices include smart thermostats, smart lighting solutions, security/alarm systems, smartwatches, health monitors, and an array of other wearable devices. Basically, an IoT device may be any "thing" embedded with electronics, software, sensors, and network connectivity, which enable the "thing" to collect and exchange data.

With the explosion in the development and adoption of IoT devices, large amounts of data from diverse locations are aggregated very quickly, thereby increasing the need for a data exchange platform that better indexes, stores and processes such data. Adding to the challenge are security concerns with cyberattacks, such as hacking and spoofing. For example, oftentimes, because the entire authentication process for registering/pairing a device with the data exchange platform is decoupled from the actual device or the user of the device, attackers may be able spoof device IDs and gain access and control over the device, as well as access sensitive information stored at the data exchange platform. Such attacks can have serious consequences considering that the device may be a security/alarm system.

SUMMARY

The present disclosure provides a method of secure device registration. According to an exemplary embodiment, the method comprises: receiving a registration request from a device; validating the device on the basis of the registration request; in response to successfully validating the device, sending a passcode to the device via a first connection; prompting a user for the passcode via a second connection different from the first connection; receiving the passcode via the second connection; and sending an authorization token to the device via the first connection. According to another embodiment, the method may be embodied as instructions that, when executed by a computer, cause the computer to perform method.

The present disclosure also provides a system of providing secure device registration. According to an exemplary embodiment, the system comprises: a proxy server and a data exchange platform server. The proxy server is configured to: receive a registration request from a device, the registration request including a digital certificate uniquely associated with the device, determine whether the digital certificate is issued by a trusted certification authority, and send the registration request to the data exchange platform server in response to a determination that the digital certificate is issued by a trusted certification authority. The data exchange platform server is configured to: validate the device on the basis of the registration request, send a passcode to the device via a first connection in response to successfully validating the device, prompt a user for the passcode via a second connection different from the first connection, receive the passcode via the second connection, and send an authorization token to the device via the first connection.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
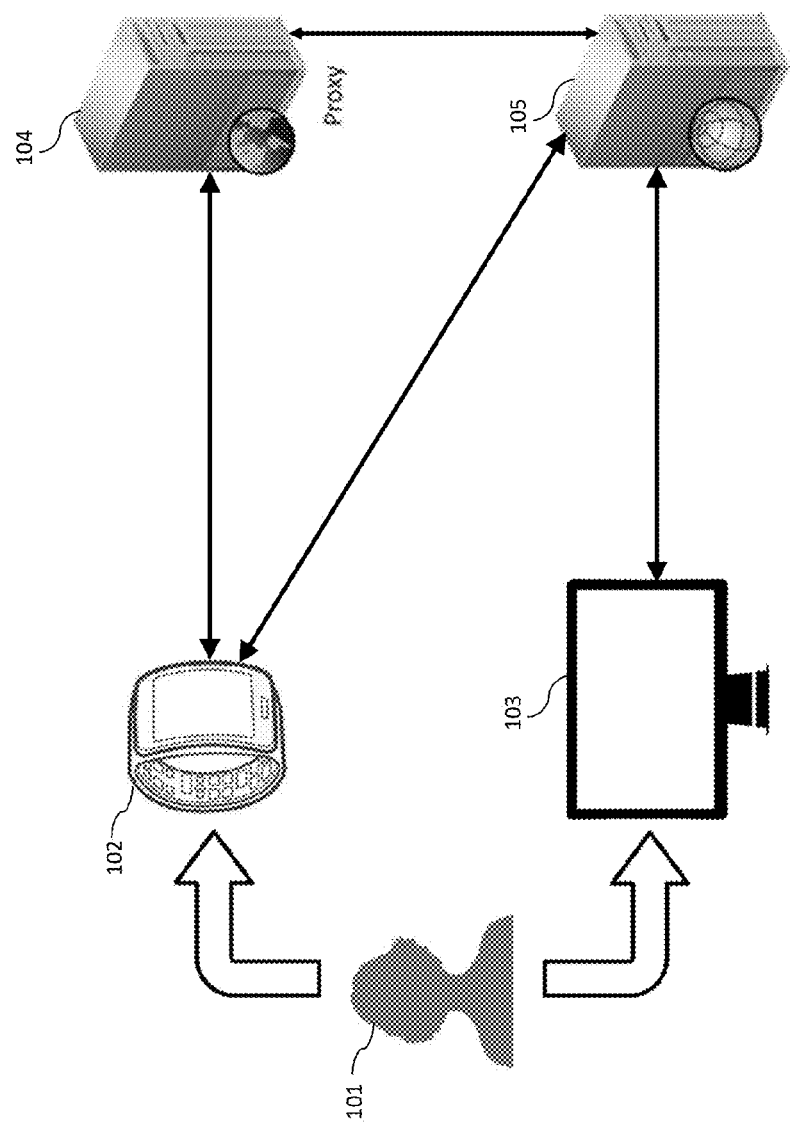
FIG. 1 illustrates an exemplary implementation of the present system and method, according to an embodiment.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

Disclosed herein are a system and method of secure device registration for establishing secure communication between a device and a data exchange platform. As mentioned earlier, the traditional process for authenticating a device may be susceptible to cyberattacks, such as spoofing, because the process generally involves active participation by either the device or the user of the device but not by both. In contrast, the present system and method of secure device registration utilize a multi-factor approach that establishes device ownership through a challenge-response mechanism, thereby ensuring the user has the device in hand during the registration process. The present system and method also provide for mutual authentication between the device and the data exchange platform such that neither the device nor the data exchange platform is vulnerable to spoofing attacks.

In short, the present system and method provide a single solution for secure device registration that includes all three mechanisms of device identification, device authentication and user authentication to provide a seamless user experience during a device registration process. Advantages of the present system and method include ensuring the integrity and origin, or fidelity, of the device data, providing end-to-end protection of the data starting from its origination on the device to storage at the data exchange platform, and enforcing an authentication standard for devices that is highly secure.

Figure 2:
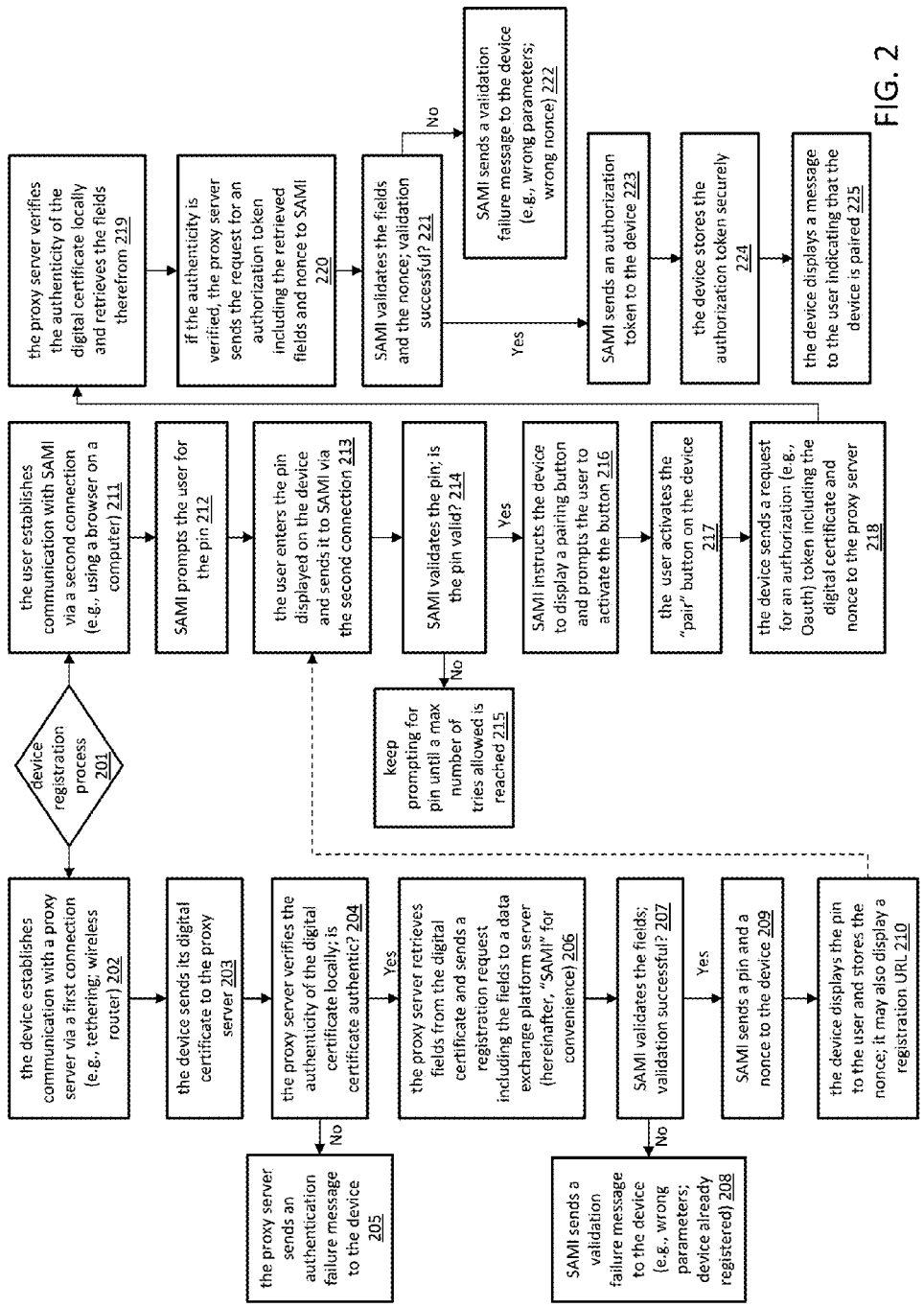
FIG. 2 illustrates a flowchart of an exemplary device registration process, according to an embodiment.

FIG. 1 illustrates an exemplary implementation of the present system and method, according to an embodiment. FIG. 2 illustrates a flowchart of an exemplary device registration process, according to an embodiment. FIGS. 1 and 2 are described in conjunction below for ease of understanding.

FIG. 1 shows a user 101 who has access to both a device 102 and a user terminal 103 separate from the device 102. The device 102 may be any device having network connectivity (e.g., Internet connectivity via Bluetooth, Wi-Fi, and WAN); for example, as FIG. 1 shows, it may be a smartwatch tethered to a smartphone's data network. Likewise, the user terminal 103 may be any device having network connectivity; for example, as FIG. 1 shows, it may be an Internet-enabled computer running a browser.

The user 101 may initiate the device registration process (at 201), for example, by turning on the device 102. The device 102 establishes communication with a proxy server 104 via a first connection (at 202). The device 102 may establish the first connection, for example, via tethering or connecting to a wireless router. The proxy server 104 serves as a first line of defense against a cyberattack and may be a high-availability, load-balancing proxy (e.g., HAProxy) server. The device 102 sends its digital certificate to the proxy server 104 (at 203). The digital certificate may be an X509 certificate issued to the device by a certification authority (CA), an entity which issues digital certificates for use by other parties. The digital certificate is stored on the device 102 along with the corresponding private key, access to which may be protected by a hardware security layer or by other means, such as an encrypted keystore file. The device 102 sends its digital certificate and its digest signed by the device's private key. The digital certificate may be uniquely associated with the device 102.

After receiving the digital certificate, the proxy server 104 verifies the authenticity of the digital certificate locally (at 204), for example, by checking whether the digital certificate was issued by an authorized CA. The proxy server 104 may validate the CA against a locally stored list of trusted CA's. If the proxy server 104 determines that the digital certificate is not authentic or is unable to authenticate the digital certificate for some reason, the proxy server 104 sends an authentication failure message to the device 102 (at 205). On the other hand, if the proxy server 104 determines that the digital certificate is authentic, the proxy server retrieves fields from the digital certificate and sends a registration request including the fields to a data exchange platform server 105 (at 206). The fields may include parameters for device identification, such as a vendor ID, a device ID, and a firmware revision value. The device ID may be a serial number that uniquely identifies a device's instance and may be stored in a CN field of an X509 certificate issued to the device by a CA. The fields may be included as part of the headers of the registration request.

The data exchange platform server 105 may be referred to as "SAMI" hereinafter for convenience. After receiving the registration request, SAMI performs device validation, which includes validating the fields included in the registration request (at 207). SAMI may check whether the CA associated with the digital certificate is known to and trusted by SAMI (e.g., by checking the issuer-DN header). SAMI may also check whether the vendor ID, device type ID, and firmware revision value are known to SAMI and match the certificate (e.g., by checking the HTTP header issuer-DN). If SAMI is unable to validate the device, SAMI sends a validation failure message to the device (at 208). For example, the validation failure message may indicate that the device parameters are incorrect and/or that the device is already registered with SAMI. The validation failure message may be an HTTP code 401 indicating unauthorized HTTP response. On the other hand, if device validation is successful, SAMI sends a passcode and a nonce to the device 102 (at 209).

The device 102 displays the passcode to the user 101 and stores the nonce (at 210). The device may also display a registration URL with which the user 101 may use to establish communication with SAMI if the user 101 has not already done so. That is, the user 101 may navigate to the registration URL to progress registration to a subsequent phase. While the device 102 is awaiting completion of the subsequent phase, the device may make API calls to query the registration status.

The user 101 establishes communication with SAMI via a second connection using the user terminal 103 (at 211). For example, the user 101 may login to SAMI using an Internet browser on the user terminal 103. If the user 101 successfully logins with SAMI, SAMI prompts the user 101 for a passcode (at 212). Using the user terminal 103, the user 101 enters the passcode displayed on the device and sends it to SAMI via the second connection (at 213).

SAMI validates the passcode entered by the user 101 (at 214). If the passcode is not valid, SAMI may indicate that the passcode is invalid and keep prompting the user 101 for the passcode until a maximum number of tries allowed (e.g., three times) is reached (at 215). If the passcode is valid, SAMI instructs the device to display a pairing button and prompts the user 101 to activate (e.g., touch or click) the pairing button (at 216).

After the user 101 activates the button (at 217), the device 102 sends a request for an authorization (e.g., OAuth) token to the proxy server 104 (at 218). The request for the token, which may be performed with an API call, includes the digital certificate and the nonce. Once again, the proxy server 104 verifies the authenticity of the digital certificate and retrieves fields from the digital certificate (at 219). If the authenticity of the digital certificate is successfully verified, the proxy server 104 sends the request for an authorization token including the retrieved fields and the nonce to SAMI (at 220). The fields may be included as part of the headers of the request. Otherwise, if verification is unsuccessful, an authentication failure message may be sent to the device 102 (not shown).

After receiving the request for an authorization token, SAMI validates the fields and the nonce (at 221). SAMI may check whether the CA associated with the digital certificate is known to and trusted by SAMI (e.g., by checking the issuer-DN header). SAMI may also validate the nonce to ensure that the nonce is valid (e.g., not expired) by retrieving device properties associated with the nonce and comparing them with individual certificate properties (e.g., headers: Cert-SN, Cert-CN, Cert-FP). If SAMI is unable to validate the fields and/or nonce, SAMI sends a validation failure message to the device (at 222). For example, the validation failure message may indicate that the device parameters are incorrect and/or that the nonce is invalid.

On the other hand, if validation is successful, SAMI sends an authorization token to the device 102 (at 223) and device registration may be deemed by SAMI to be complete. Upon successful registration, SAMI stores individual certificate properties and device parameters in a database (e.g., headers: Cert-SN (certificate's individual serial number), Cert-CN, Cert-FP (certificate's individual fingerprint), vendor ID, device type ID, and firmware revision value). The device parameters may be used to identify a manifest to use with the device 102 and implement other suitable device specific logic. For example, the device specific logic may be related to a vendor, device type, and/or firmware revision.

Figure 3:
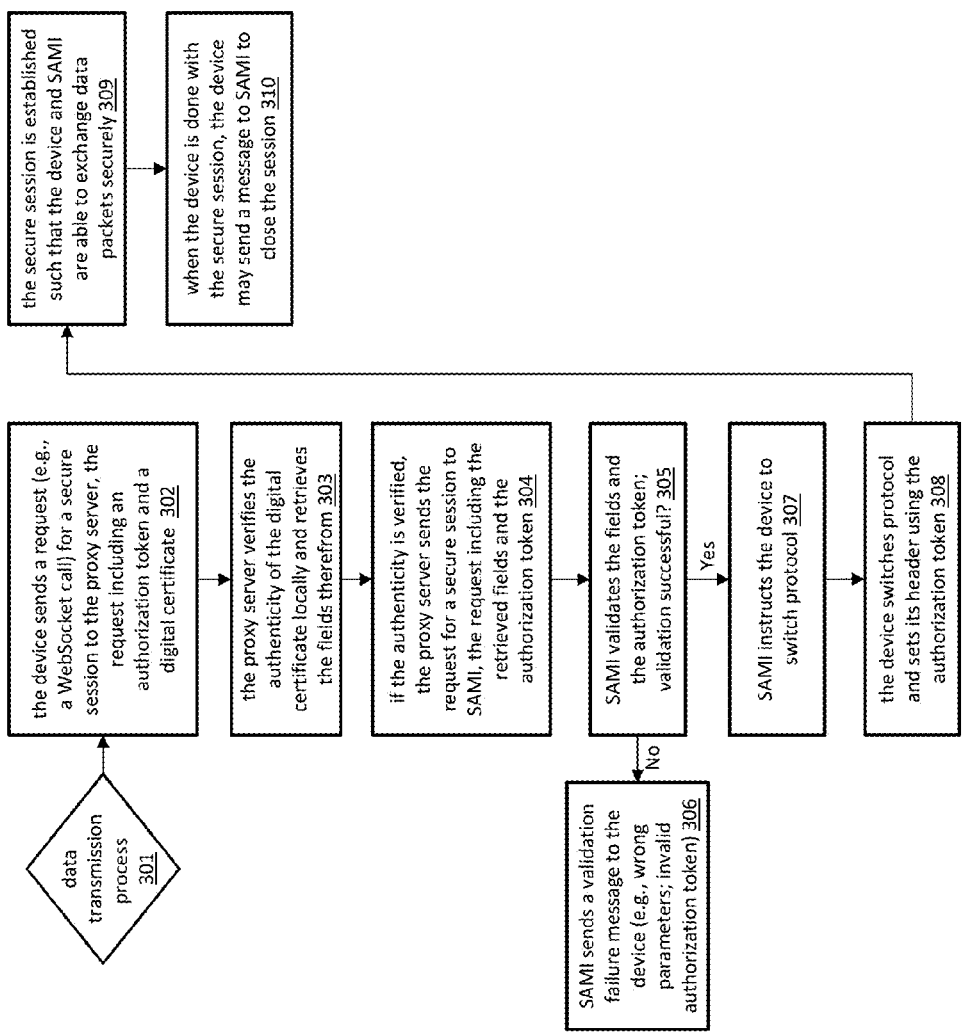
FIG. 3 shows a flowchart of an exemplary secure data exchange process between a registered device and a data exchange platform server, according an embodiment.

To complete the registration process on the device side, the device 102 stores the authorization token securely (at 223) and displays a message to the user indicating that the device 102 is successfully registered and paired with SAMI. Once the device 102 is successfully registered and paired with SAMI, the device 102 is able to initiate a secure data exchange session (e.g., a WebSocket) with SAMI. FIG. 3 shows a flowchart of an exemplary secure data exchange process between a registered device and SAMI, according an embodiment.

The device 102, now registered, initiates the data exchange process (at 301) by sending a request (e.g., a WebSocket) for a secure session to the proxy server 104 (at 302). The request includes the authorization token issued by SAMI in the device registration process and the device's digital certificate. The proxy server 104 verifies the authenticity of the digital certificate and retrieves fields from the digital certificate (at 303). If the authenticity of the digital certificate is successfully verified, the proxy server 104 sends the request for a secure session including the retrieved fields and the authorization token to SAMI (at 304). Otherwise, if authentication fails, an authentication failure message may be sent to the device 102 (not shown).

SAMI validates the request for a secure session, including the fields and the authorization token (at 305). SAMI may check whether the fields (e.g., device ID, vendor ID and firmware revision value) and authorization token match those of an already registered device. If SAMI is unable to validate the fields and/or authorization token, SAMI sends a validation failure message to the device (at 306). For example, the validation failure message may indicate that the device parameters are incorrect and/or that the authorization token is invalid.

On the other hand, if the request validation is successful, SAMI instructs the device 102 to switch protocol (at 307). The device 102 switches the protocol and sets its header using the authorization token (at 308). At this point, the secure session is established such that the device 102 and SAMI are able to exchange data packets securely (at 309). When the device 102 is done with the secure session, the device 102 may send a message to SAMI to close the secure session (at 310).

Figure 4:
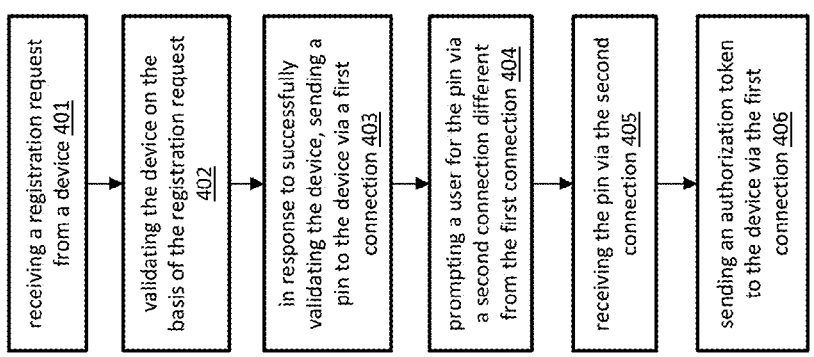
FIG. 4 shows a high-level flowchart of the exemplary operations of the data exchange platform server, according to an embodiment.

As a quick recap, FIG. 4 shows a high-level flowchart of the exemplary operations of the data exchange platform server, according to an embodiment. The data exchange platform server, or SAMI, receives a registration request from a device (at 401). SAMI validates the device on the basis of the registration request (at 402). In response to successfully validating the device, SAMI sends a passcode to the device via a first connection (at 403). SAMI prompts a user for the passcode via a second connection different from the first connection (at 404). SAMI receives the passcode via the second connection (at 405). SAMI sends an authorization token to the device via the first connection (at 406).

Thus, in summary, the present disclosure provides a single solution for secure device registration that includes all three mechanisms of device identification, device authentication and user authentication, advantages of which include, but not limited to, ensuring the fidelity device data, providing end-to-end protection of the device data starting from its origination on the device to storage at the data exchange plaftorm, and enforcing an authentication standard for devices that is highly secure.

Figure 5:
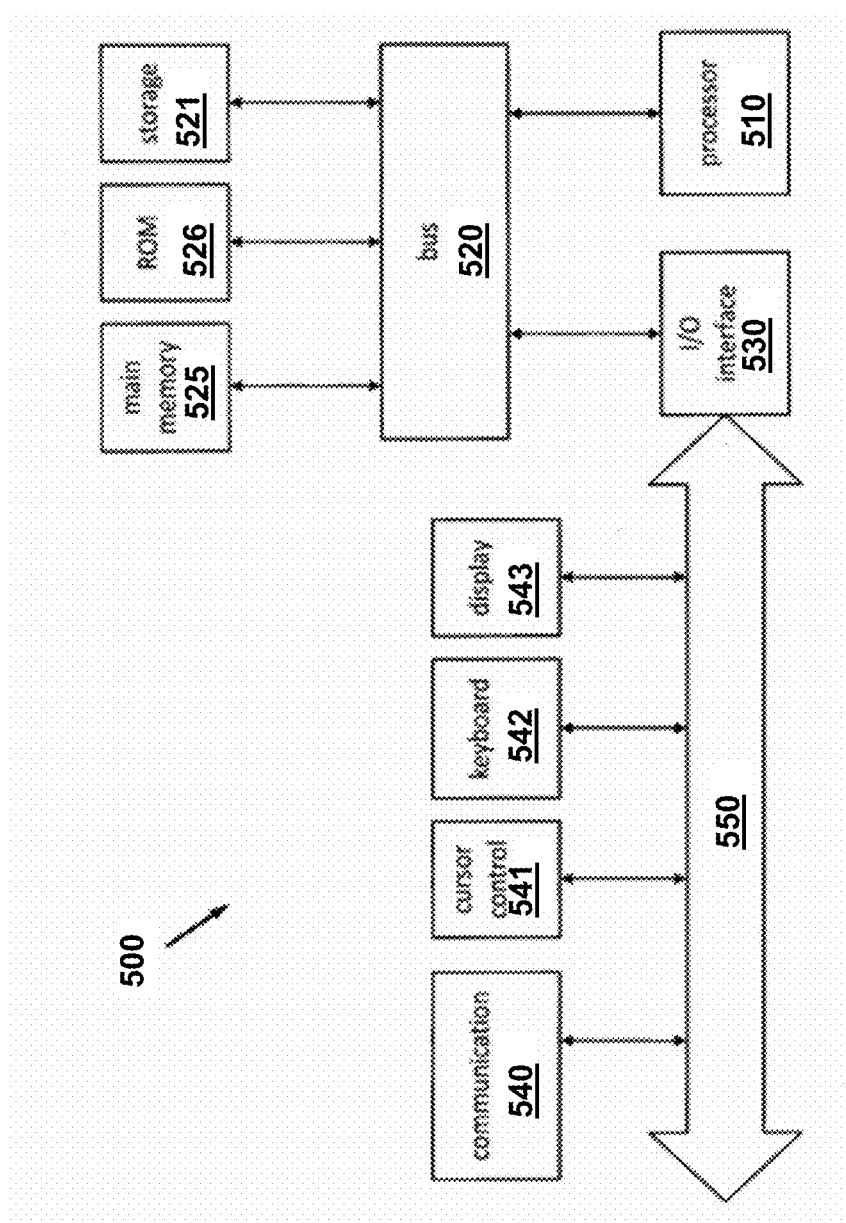
FIG. 5 illustrates an exemplary computer architecture that may be used for implementing the present system, according to an exemplary embodiment.

FIG. 5 illustrates an exemplary computer architecture that may be used for implementing the present system, according to an exemplary embodiment. The exemplary computer architecture may be used for implementing one or more components described in the present disclosure including, but not limited to, the user terminal and/or the proxy and data exchange platform servers. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 may also include a read only memory (ROM) and/or other static storage device 526 coupled to bus 520 for storing static information and instructions used by processor 510.

A data storage device 521 such as a magnetic disk or optical disc and its corresponding drive may also be coupled to architecture 700 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542, a cursor control device 541, and/or a touchscreen device).

The communication device 540 allows for access to other computers (e.g., servers or clients) via a network. The communication device 540 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A method of improving security of a computer server system through secure device registration, the method comprising:

receiving, by the computer server system, a registration request from a first device via a first connection, the first device being a wearable device having network connectivity, the registration request including a digital certificate uniquely associated with the first device;

validating, by the computer server system, the first device on the basis of the registration request by determining whether the digital certificate is issued by a trusted certification authority;

sending, by the computer server system, a passcode and a nonce to the first device via the first connection in response to successfully validating the first device and instructing the first device to display the passcode;

sending, by the computer server system, a validation failure message to the first device via the first connection in response to a validation failure;

in response to sending the passcode to the first device via the first connection, prompting, by the computer server system, for the passcode on a second device via a second connection different from the first connection, the second device being a network-enabled computer;

receiving, by the computer server system, a passcode input from the second device via the second connection;

in response to receiving the passcode input containing the valid passcode on the second device via the second connection, instructing the first device to display a pairing button;

in response to receiving an activation of the pairing button on the first device, receiving a request for an authorization token from the first device via the first connection, the request for the authorization token including the digital certificate and the nonce;

in response to successfully validating the digital certificate and the nonce, sending, by the computer server system, an authorization token to the first device via the first connection;

in response to sending the authorization token to the first device, completing pairing of the first device with the computer server system;

in response to receiving the passcode input containing an invalid passcode, prompting, by the computer server system, for the passcode from the second device via the second connection for a predetermined number of tries;

in response to receiving the passcode input containing an invalid passcode after the predetermined number of tries, denying, by the computer server system, the registration request from the first device to enforce a secure authentication standard for device registration;

in response to completing the pairing of the first device with the computer server system, storing at the computer server system device parameters associated with the first device and identifying, at the computer server system, a manifest to use with the first device based on the device parameters; and in response to completing the pairing of the first device with the computer server system, establishing a secure data exchange session between the first device and the computer server system to exchange data packets securely, wherein the first device set headers of data packets to be transmitted to the computer server system using the authorization token and wherein the computer server system exchanges data packets with the first device using the device parameters.

2. The method of claim 1, wherein validating the first device includes retrieving fields from the digital certificate, the fields including one or more of a device ID, a vendor ID, and a firmware revision value, and validating the fields.

3. A non-transitory, tangible computer readable storage medium having stored thereon computer executable instructions that, when executed by a computer, cause the computer to perform the following to improve the security of the computer through secure device registration:

receiving a registration request from a first device via a first connection, the first device being a wearable device having network connectivity, the registration request including a digital certificate uniquely associated with the first device;

validating the first device on the basis of the registration request by determining whether the digital certificate is issued by a trusted certification authority;

sending a passcode and a nonce to the first device via the first connection in response to successfully validating the first device and instructing the first device to display the passcode;

sending a validation failure message to the first device via the first connection in response to a validation failure;

in response to sending the passcode to the first device via the first connection, prompting for the passcode on a second device via a second connection different from the first connection, the second device being a network-enabled computer;

receiving a passcode input from the second device via the second connection;

in response to receiving the passcode input containing the valid passcode on the second device via the second connection, instructing the first device to display a pairing button;

in response to receiving an activation of the pairing button on the first device, receiving a request for an authorization token from the first device via the first connection, the request for the authorization token including the digital certificate and the nonce;

in response to successfully validating the digital certificate and the nonce, sending an authorization token to the first device via the first connection;

in response to sending the authorization token to the first device, completing pairing of the first device with the computer server system;

in response to receiving the passcode input containing an invalid passcode, prompting for the passcode from the second device via the second connection for a predetermined number of tries;

in response to receiving the passcode input containing an invalid passcode after the predetermined number of tries, denying the registration request from the first device to enforce a secure authentication standard for device registration;

in response to completing the pairing of the first device with the computer server system, storing at the computer server system device parameters associated with the first device and identifying, at the computer server system, a manifest to use with the first device based on the device parameters; and in response to completing the pairing of the first device with the computer server system, establishing a secure data exchange session between the first device and the computer server system to exchange data packets securely, wherein the first device set headers of data packets to be transmitted to the computer server system using the authorization token and wherein the computer server system exchanges data packets with the first device using the device parameters.

4. The computer readable storage medium of claim 3, wherein validating the first device includes retrieving fields from the digital certificate, the fields including one or more of a device ID, a vendor ID, and a firmware revision value, and validating the fields.

5. A computer-implemented system with improved security through secured device registration, the system comprising:

a proxy server implemented using one or more computers; and a data exchange platform server using one or more computers, wherein:

the proxy server is configured to:

receive a registration request from a first device via a first connection, the first device being a wearable device having network connectivity, the registration request including a digital certificate uniquely associated with the first device, determine whether the digital certificate is issued by a trusted certification authority, and send the registration request to the data exchange platform server in response to a determination that the digital certificate is issued by a trusted certification authority; and the data exchange platform server is configured to:

validate the first device on the basis of the registration request, send a passcode and a nonce to the first device via the first connection in response to successfully validating the first device and instructing the first device to display the passcode, send a validation failure message to the first device via the first connection in response to a validation failure;

in response to sending the passcode to the first device via the first connection, prompt for the passcode on a second device via a second connection different from the first connection, the second device being a network-enabled computer, receive a passcode input from the second device via the second connection, in response to receiving the passcode input containing the valid passcode on the second device via the second connection, instruct the first device to display a pairing button;

in response to receiving an activation of the pairing button on the first device, receive a request for an authorization token from the first device via the first connection, the request for the authorization token including the digital certificate and the nonce;

in response to successfully validating the digital certificate and the nonce, send an authorization token to the first device via the first connection;

in response to sending the authorization token to the first device, complete pairing of the first device with the data exchange platform server;

in response to receiving the passcode input containing an invalid passcode, prompt for the passcode from the second device via the second connection for a predetermined number of tries;

in response to receiving the passcode input containing an invalid passcode after the predetermined number of tries, deny the registration request from the first device to enforce a secure authentication standard for device registration;

in response to completing the pairing of the first device with the computer server system, store at the computer server system device parameters associated with the first device and identifying, at the computer server system, a manifest to use with the first device based on the device parameters; and in response to completing the pairing of the first device with the computer server system, establish a secure data exchange session between the first device and the computer server system to exchange data packets securely, wherein the first device set headers of data packets to be transmitted to the computer server system using the authorization token and wherein the computer server system exchanges data packets with the first device using the device parameters.

6. The system of claim 5, wherein to validating the first device includes retrieving fields from the digital certificate, the fields including one or more of a device ID, a vendor ID, and a firmware revision value, and validating the fields.

* * * * *